United States Patent
Heiges

[11] Patent Number: 5,279,063
[45] Date of Patent: Jan. 18, 1994

[54] DECOY WITH FLEXIBLE NECK

[76] Inventor: Charles W. Heiges, 2156 E. State Rd., Port Clinton, Ohio 43452

[21] Appl. No.: 911,965

[22] Filed: Jul. 10, 1992

[51] Int. Cl.⁵ .............................................. A01M 31/06
[52] U.S. Cl. .................................................... 43/3
[58] Field of Search ...................................... 43/2, 3

[56] References Cited

U.S. PATENT DOCUMENTS

| | | | |
|---|---|---|---|
| 1,452,329 | 4/1923 | Utter | 43/3 |
| 3,034,245 | 5/1962 | Lynch | 43/3 |
| 4,651,458 | 3/1987 | Lanius | 43/3 |
| 4,753,028 | 6/1988 | Farmer | 43/3 |
| 4,928,418 | 5/1990 | Stelly | 43/3 |

Primary Examiner—Kurt C. Rowan
Attorney, Agent, or Firm—Marshall & Melhorn

[57] ABSTRACT

A wild game decoy including a flexible reconfigurable neck interconnecting a head and a body. The neck may be manually reconfigured to position the head relative to the body, and the neck will remain in the selected position so as to cause the decoy to assume and retain various selected lifelike poses. The decoy may include supports which selectively permit it to stand in a rigid position or rock back and forth upon the supporting surface.

15 Claims, 1 Drawing Sheet

DECOY WITH FLEXIBLE NECK

BACKGROUND OF THE INVENTION

1. Field of the Invention

The present invention relates broadly to decoys for use in the hunting of wild game, and more particularly to a novel neck construction for such decoys.

2. Description of the Prior Art

Various types of decoys have been employed heretofore in the hunting of wild game such as deer, turkeys, and particularly waterfowl such as ducks and geese, in order to attract the game and to entice them to approach a designated particular area of land or water. When hunting is to be conducted in a selected area, a number of decoys may be deployed in the area to attract the game to the location. The more natural and realistic the group of decoys can be made to appear, the more likely it is to attract wild game. Where all of the decoys are of identical configuration, they present an unnatural appearance noticeable to the game. In order to make a group of decoys appear more natural, it is desirable to deploy the decoys in a variety of poses, simulating feeding, resting or other natural activities.

Heretofore, decoys have generally been provided in fixed poses. If a hunter wished to deploy decoys in different poses, such as with the head erect, as well as in a head-down, feeding position, it was necessary to maintain an inventory of different decoys. This practice was not entirely satisfactory due to the multiplicity of decoys which had to be purchased, transported, and stored in order to have a suitable selection of decoy poses available for various circumstances.

Efforts to overcome this deficiency resulted in the development of decoys with interchangeable heads, the heads being intended to simulate a variety of poses. Such an arrangement has not proved entirely satisfactory due to the limited range of poses which it permits, and the fact that it is necessary to maintain an inventory of different heads.

SUMMARY OF THE INVENTION

In accordance with the present invention, there is provided a hunting decoy of novel and improved construction. The decoy includes a body, to which a head is attached by means of a malleable, flexible neck member. The neck may be manually manipulated to support and position the head in any desired attitude relative to the decoy body. In a preferred embodiment the neck merges with a portion of the chest or breast mounted for limited pivoting movement to provide the decoy with a more natural appearance in the neck-extended, feeding attitude. The malleable neck is provided with a suitably configured exterior surface to provide a realistic appearance. The decoys may be adapted for floating deployment on the water, or they may be provided with suitable support means for maintaining them in a erect standing position. The support means permits the decoys to selectively assume a rockable attitude or a rigid, upstanding attitude.

It is, therefore, a primary object of the invention to provide a decoy which may be reconfigured to present various realistic appearances.

Another object of the invention to provide a decoy which has a flexible, reconfigurable neck member.

Still another object of the invention is to provide a decoy which is realistic in appearance and which may be adapted to assume different realistic poses appropriate for the game which is to be attracted.

Other objects and advantages will become more apparent during the course of the following description, when taken in connection with the accompanying drawing.

BRIEF DESCRIPTION OF THE DRAWINGS

In the drawings, wherein like numerals refer to like parts throughout.

DESCRIPTION OF THE PREFERRED EMBODIMENT

Figure 1:
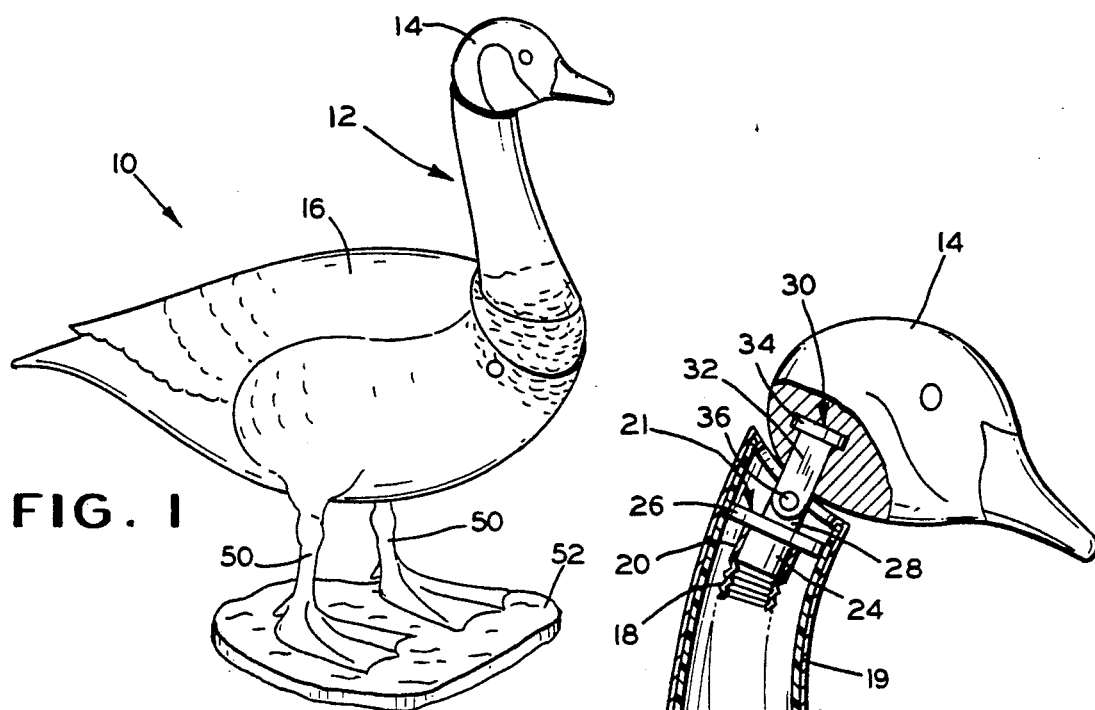
FIG. 1 is a perspective view of one form of decoy embodying the invention.

Referring now to the drawings, there is shown generally at 10 a decoy embodying the invention. The decoy illustrated is a waterfowl, more particularly a goose decoy, including a neck assembly shown generally at 12, which interconnects a head 14 and a body 16. The head 14 and body 16 may be solid molded members, for example of a foamed plastic material. Another suitable form of body construction is shown and described in my earlier U.S. Pat. No. 4,890,408, the disclosure of which is incorporated herein by reference.

Figure 2:
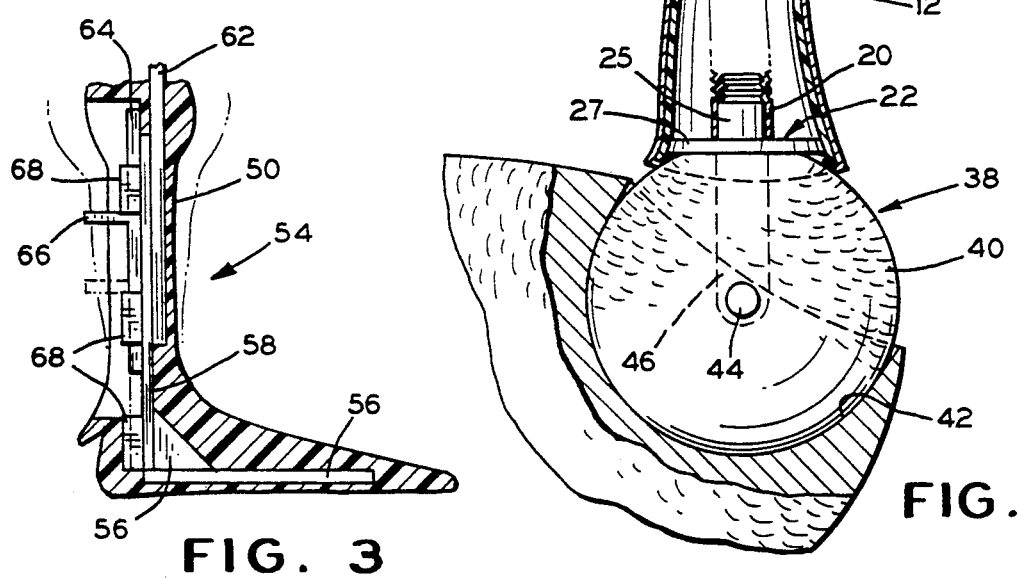
FIG. 2 is a fragmentary side elevational view, partially in section, of the neck area of a decoy embodying the invention.

In the embodiment of FIG. 2 the neck assembly comprises a deformable tubular support member 18 disposed within a flexible sleeve 19. The support member 18 may suitably comprise any of a number of well-known products which may be readily manually deformed or bent and which will retain the shape to which they are bent. In the embodiment of FIG. 2 the member 18 comprises a malleable helical wire within a supple plastic sheath as of polypropylene such as is used as pliable duct work. Other suitable materials will be hereinafter described.

The tubular support member 18 is provided with molded cuffs 20 at its opposite ends. Similar mounting brackets, shown generally at 21 and 22, are affixed at the head end and the body end, respectively, of the support member by means of bosses 24 and 25 received within the respective cuffs. The mounting brackets 21 and 22 include circumferential spacer flanges 26 and 27, respectively, of such diameter that their peripheral edge engages the inner wall of the sleeve 19 to position the mounting brackets 21 and 22 axially within the sleeve.

The head end mounting bracket 21 includes a hinge leaf 28 for hingedly connecting the mounting bracket to a head anchor 30. The head anchor comprises a hinge leaf 32 affixed to a base plate 34 secured to or imbedded within the head 14 as by being integrally molded therein, and pivotally coupled to the corresponding hinge leaf 28 by a hinge pin 36. The hinge leaf may alternatively extend into the head for positioning the hinge pin within the head if desired.

In order to simulate the anatomy of the waterfowl and provide a more realistic appearance as the configuration is adjusted between poses, the tubular support member 18 is affixed to the body 16 by means of a modified ball and socket arrangement shown generally at 38.

More particularly, a rotatable insert 40 roughly in the form of an oblate spheroid is received within a correspondingly shaped recess 42 formed in the breast or chest area of the decoy. The insert is mounted upon a shaft 44 carried at its ends in the body 16 encompassing the end portions of the insert 40, so as to be rotatable about its longitudinal axis. The body end mounting bracket 22 may include a hinge leaf 46 which extends into the insert 40 and is coupled to the shaft 44 for affixing the support member 18 to the body. Of course, the neck assembly 12 may be affixed to the insert 40 in other suitable ways.

The hinged connections are conventionally constructed with sufficient frictional engagement between the members for the hinges to be readily manually deflected and to remain in any angular position at which they are set. Thus, as will be readily apparent, the angular attitude of the base of the neck relative to the body 16 and of the head 14 relative to the neck, can be adjusted in conjunction with the manipulation of the neck configuration itself to achieve various realistic poses.

A pliable covering 48 may cover the outer surface of the sleeve 19 and extend to the insert 40. The insert is textured on its outer surface so as to merge with the outer covering of the body. The covering 48 is suitably textured and colored as indicated in FIG. 1 to match the markings of a selected one of the many waterfowl species. The head 14 and the body 16 are similarly painted to resemble the markings of the selected species.

In use, the neck assembly 12 and the head 14 may be moved relative to the body 16. The hinged connections move with a slight friction which allows them to be operated, yet retain their position to support the neck 12 and the head 14 of the decoy when released. Additionally, the tubular support member 18 may be flexed to bend the neck 12 into a selected lifelike posture. The support member 18 will hold the shape into which it is manipulated, and thus the decoy 10 may be suitably arranged to assume various lifelike poses. Since the point at which the lower end of the neck assembly 12 pivots is effectively located within the breast of the decoy, the neck motion more nearly simulates that of an actual goose and gives a very natural appearance when the neck is lowered.

As illustrated in FIG. 1, the body 16 of the decoy may be provided with legs 50 for support when the decoy is to be deployed on land. If the decoy is of a two legged game animal, such as the goose decoy illustrated, the feet of the decoy may be attached to a supporting base or platform 52 to maintain the decoy erect. If the decoy is to be deployable on either land or water, inserts (not shown) may be provided in the bottom of the body for removably receiving posts which may be forced into the ground a short distance as the decoys are deployed. Of course, if the decoy is of a four legged species, such as deer, the supporting platform 48 may not be required.

Figure 3:
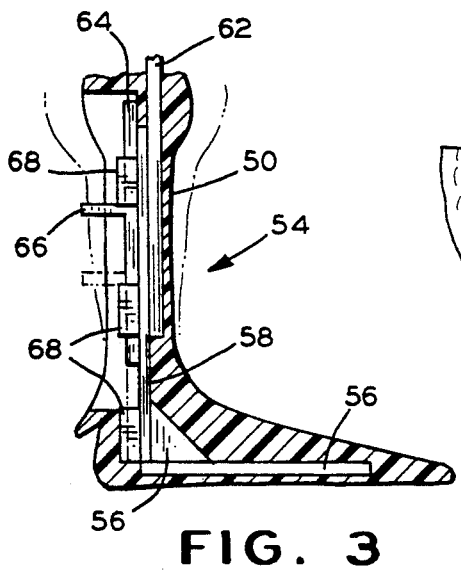
FIG. 3 is an enlarged fragmentary view of a portion of the decoy of FIG. 1, showing details of a form of leg construction for the decoy.

In order to further enhance the realistic appearance of the decoys when deployed on land, they may be provided with a flexible leg construction which allows the decoy to rock back and forth in response to the wind to simulate a walking or feeding motion. To that end, as shown in FIG. 3 there may be embedded in the legs 50 a suitable flexing joint, shown generally at 54, which may selectively hold the body in a rigid erect stance, or allow it to rock forwardly and rearwardly about the feet on the base 52 in response to an applied force as from the wind or by means of a line (not shown) extending to a remote blind in which a hunter is concealed. The flexing joint may comprise a plate member 56 disposed in the foot portion of the leg 50 and affixed to an upstanding flexible strut 58 which may be a strip of spring steel. A gusset plate 60 is provided to rigidify the joint between the plate member and the flexible strut. The flexible strut overlaps and is affixed to a rigid strip 62 which is embedded in and extends upwardly through the leg 50. A latch bar 64 having a grasping extension 66 is mounted for axial sliding movement within a plurality of U-shaped straps 68 affixed to the flexible strut 58. The material forming the leg 50 and covering the flexible joint 54 is likewise flexible and is open at the rear so that the extension 66 can be grasped for axially sliding the latch bar 64 within the straps 68. Thus, the latch bar may be selectively moved between the position shown in solid lines in FIG. 3, wherein the joint may flex above the gusset plate 60, and the position shown in broken lines wherein the latch bar is engaged within the lower strap 68 to prevent flexing of the flexible strut. It is contemplated that the flexing joint 54 may be incorporated in other support means for the decoy such as the aforementioned posts for insertion in the ground for positioning the decoy.

Figure 4:
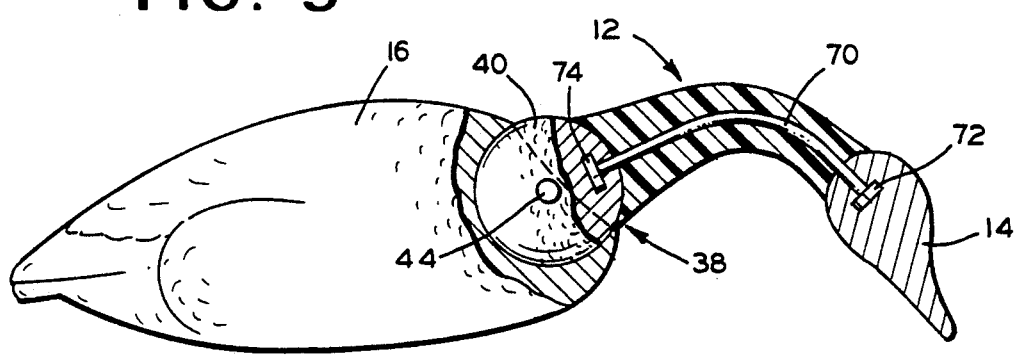
FIG. 4 is a side elevational view, partially in section, of a decoy illustrating an alternate embodiment of the invention.

There is shown in FIG. 4 an alternate embodiment of the invention, providing a somewhat simplified construction, wherein the neck assembly 12 comprises a malleable wire 70 provided at one end with an anchor flange 72 for embedding in the decoy's head 14. The wire 70 is provided at the other end with an anchor flange 74 for embedding in the rotatable insert 40. Of course, other and different means may be conventionally provided for securing the wire to the rotatable insert and the head. A flexible outer sheath portion 76 surrounds the wire 70 between the head 14 and the rotatable insert. The outer portion 76 is preferably formed of a soft, closedcell foamed plastic material, and may be formed with a suitably textured outer surface. Such products are, for example, conventionally employed as hair curlers. The outer surface of the sheath 76, and the remainder of the decoy 10, are textured and colored to resemble the markings of a selected one of the many game animal species. The neck 12 may be suitably bent and the insert 40 rotated to position the head 14 relative to the body 16, and the wire 70 will support the head 14 when the decoy 10 is deployed.

The invention as depicted in FIG. 4 graphically illustrates the more natural configuration of the neck and head of the decoy in a feeding position made possible by mounting the neck upon the rotatable insert 40. In addition to being flexible, the neck can thus be pivoted about its base in the chest or breast area in a manner very similar to that which occurs in the actual animal or fowl.

In still another embodiment the neck may comprise a conventional plastic material with memory, such as employed in reconfigurable toys. The plastic material may thus be molded in the form of the neck 12 as illustrated in FIG. 4, but without the necessity for the malleable wire 70, and suitably affixed to the head 14 and the rotatable insert 40, for example, by use of an adhesive or internal dowels. The neck 12 may have a suitably textured outer surface, or may be provided with a separate outer covering having a suitably textured outer surface. The neck 12 may thus be suitably bent and the insert 40 rotated to position the decoy 10 in a lifelike pose, and the plastic material will remain in the selected position until the neck is suitably repositioned to another pose.

There thus is provided a decoy having a flexibly positionable neck which may be manually manipulated to selectively support and position the head relative to the decoy body. The decoy, including the neck, is provided with a suitably textured and marked exterior surface to provide a realistic appearance.

In accordance with the provisions of the patent statutes, the present invention has been described in what is considered to represent its preferred embodiments. However, it should be noted that the invention can be practiced otherwise than as specifically illustrated and described without departing from its spirit or scope. For example, it is fully contemplated that the flexibly positionable neck of the present invention may be utilized in decoys for a variety of animal species, and not limited to waterfowl decoys.

It is to be understood that the forms of the invention herewith shown and described are to be taken as illustrative embodiments of the same, and that various changes in the shape, size and arrangements of parts may be resorted to without departing from the spirit of the invention.

What is claimed is:

1. A wild game decoy including a body, a head, and a neck member interconnecting the body and the head, the neck member being flexible and remaining in any of a plurality of configurations to which it is manipulated whereby the position of the neck and head may be manually manipulated relative to the body to cause the decoy to assume and retain selected lifelike poses, said neck member comprising a helical wire within a plastic sheath.

2. The invention of claim 1, wherein said wild game decoy is a bird decoy.

3. The invention of claim 2, wherein said wild game decoy is a waterfowl decoy.

4. The neck member of claim 1, wherein said neck member is contained within a pliable covering extending between said head and said body, the covering being provided with a textured outer surface.

5. The invention of claim 1, wherein said neck member is provided with a textured outer surface.

6. A wild game decoy as claimed in claim 1, including a hinge member interconnecting said head and said flexible neck member.

7. A wild game decoy as claimed in claim 1, including hinge means interconnecting said flexible neck member and said body.

8. A wild game decoy as claimed in claim 1, including support means affixed to the body for maintaining said decoy in an upstanding position upon a supporting surface, said support means including a flexible section for selectively permitting rocking movement of said body relative to said supporting surface.

9. A wild game decoy including a body, a head, and a neck member interconnecting the body and the head, the neck member being flexible and remaining in any of a plurality of configurations to which it is manipulated whereby the position of the neck and head may be manually manipulated relative to the body to cause the decoy to assume and retain selected lifelike poses, said neck member comprising a supple plastic tube with an embedded helical wire, whereby said neck member is also axially extensible.

10. A wild game decoy including a body, a head, a neck member interconnecting the body and the head, the neck member being flexible and remaining in any of a plurality of configurations to which it is manipulated whereby the position of the neck and head may be manually manipulated relative to the body to cause the decoy to assume and retain selected lifelike poses, a hinge means interconnecting said flexible neck member and said body, said body including a chest portion, said hinge means including a section of said chest portion mounted for rotational adjustment relative to said body.

11. A wild game decoy as claimed in claim 10, wherein said section of said chest portion is of generally oblate spheroid configuration with a longitudinal axis, said oblate spheroid section being mounted for rotation about said longitudinal axis within said chest portion.

12. A wild game decoy as claimed in claim 10, including a hinge member interconnecting said head and said flexible neck member.

13. A wild game decoy comprising a body, neck and head simulating the wild game, and support means affixed to the body for maintaining the decoy in an upstanding position upon a supporting member, said support means including a section for selectively maintaining the body in a rigid position and permitting rocking movement of the body relative to the supporting member, said section for selectively maintaining the body comprising spaced rigid sections of said support means interconnected by a flexible section.

14. A wild game decoy as claimed in claim 13, including latch means moveable between a first position rigidly interconnecting said spaced rigid sections of said support means and a second position permitting flexing of said flexible section.

15. A wild game decoy as claimed in claim 14, wherein said latch means comprises an elongated latch bar axially slidable between said first and second positions.

* * * * *